US010849803B2

(12) United States Patent
Shim

(10) Patent No.: US 10,849,803 B2
(45) Date of Patent: Dec. 1, 2020

(54) ATTACHING AND DETACHING TYPE DRIVING DEVICE AND WHEELCHAIR HAVING THE SAME

(71) Applicant: TODO WORKS CO., LTD., Siheung-si (KR)

(72) Inventor: Jae Shin Shim, Siheung-si (KR)

(73) Assignee: TODO WORKS CO., LTD., Siheung-si (KR)

( * ) Notice: Subject to any disclaimer, the term of this patent is extended or adjusted under 35 U.S.C. 154(b) by 151 days.

(21) Appl. No.: 16/047,097

(22) Filed: Jul. 27, 2018

(65) Prior Publication Data

US 2018/0353356 A1    Dec. 13, 2018

Related U.S. Application Data

(63) Continuation of application No. PCT/KR2016/004834, filed on May 9, 2016.

(30) Foreign Application Priority Data

Jan. 28, 2016    (KR) .................. 10-2016-0010648

(51) Int. Cl.
*A61G 5/04*    (2013.01)
*H01M 2/10*    (2006.01)
(Continued)

(52) U.S. Cl.
CPC ............. *A61G 5/047* (2013.01); *A61G 5/045* (2013.01); *A61G 5/10* (2013.01); *A61G 5/1054* (2016.11);
(Continued)

(58) Field of Classification Search
CPC .......... A61G 5/047; A61G 5/10; A61G 5/045; A61G 5/1024; A61G 2203/14; B62D 11/02; H01M 2/10
(Continued)

(56) References Cited

U.S. PATENT DOCUMENTS 3,100,860 A    8/1963    Rosenthal
3,337,261 A *  8/1967    Nihlean ............... A61G 5/1054
                                                      297/44
(Continued)

FOREIGN PATENT DOCUMENTS

FR    2 455 886 A1    12/1980
KR    20-0193359 Y1    8/2000
(Continued)

OTHER PUBLICATIONS

The extended European search report issued by the European Patent Office dated Nov. 21, 2018, which corresponds to European Patent Application No. 16888268.6-1113 and is related to U.S. Appl. No. 16/047,097.

*Primary Examiner* — Jacob D Knutson
*Assistant Examiner* — Felicia L. Brittman
(74) *Attorney, Agent, or Firm* — Studebaker & Brackett PC

(57) ABSTRACT

The inventive concept relates to an attaching and detaching type driving device, which is formed to be attachable and detachable to a manual wheelchair whose wheels are manually driven by a user, and to switch the manual wheelchair to an electric wheelchair that automatically drives wheels using power, and particularly, which is capable of being attached to and detached from the manual wheelchair regardless of shape or size of the wheelchair, being switched to the electric wheelchair, and supplying the electric wheelchair with low cost. The attaching and detaching type driving device includes a driving module mounted on each of both installation frames supporting both wheels in the wheelchair and putting rollers in close contact with the wheels to transfer a rotational force of the rollers to the wheels and a steering module controlling a drive of the driving module.

13 Claims, 7 Drawing Sheets

(51) Int. Cl.
*A61G 5/10* (2006.01)
*B62D 11/02* (2006.01)

(52) U.S. Cl.
CPC .............. *B62D 11/02* (2013.01); *H01M 2/10* (2013.01); *A61G 2203/14* (2013.01)

(58) Field of Classification Search
USPC ........................................................ 180/6.2
See application file for complete search history.

(56) References Cited

U.S. PATENT DOCUMENTS

| | | |
|---|---|---|
| 3,786,887 A | 1/1974 | Rosenthal et al. |
| 3,893,529 A | 7/1975 | Karchak, Jr. et al. |
| 4,805,711 A | 2/1989 | Lautzenhiser |
| 5,590,893 A * | 1/1997 | Robinson ................. A61G 5/00 280/250.1 |
| 2004/0051272 A1* | 3/2004 | Wong ...................... A61G 5/023 280/244 |
| 2007/0024020 A1* | 2/2007 | Orford .................... A61G 5/023 280/242.1 |
| 2010/0193278 A1* | 8/2010 | Husted ..................... B60K 1/00 180/291 |
| 2012/0279789 A1 | 11/2012 | Brill et al. |
| 2018/0280213 A1* | 10/2018 | Hancock ................ A61G 5/048 |

FOREIGN PATENT DOCUMENTS

| | | |
|---|---|---|
| KR | 10-2012-0103369 A | 9/2012 |
| KR | 10-2012-0114560 A | 10/2012 |
| KR | 10-2013-0024843 A | 3/2013 |
| KR | 10-2016-0053739 A | 5/2016 |

* cited by examiner

[FIG. 1]
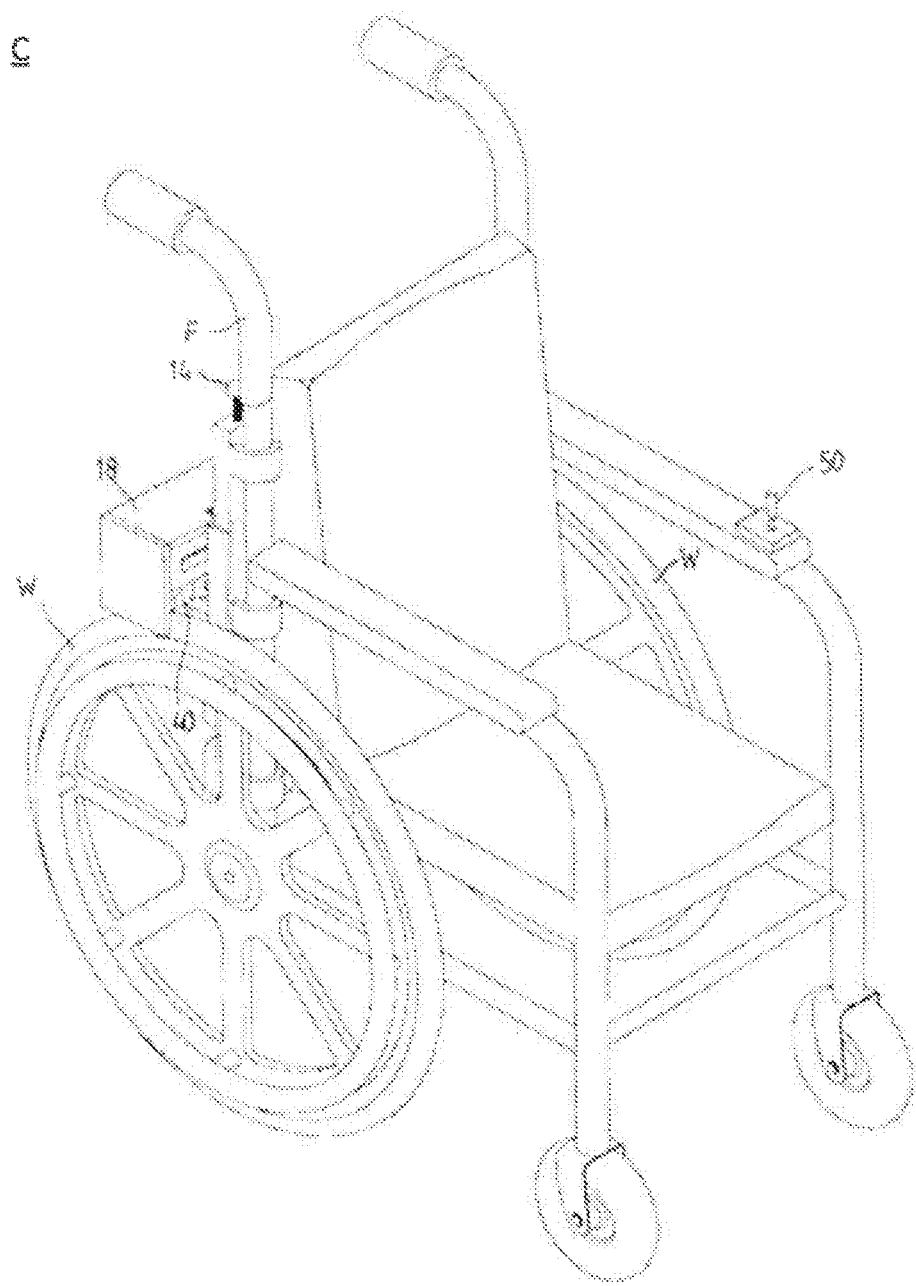

[FIG. 2]
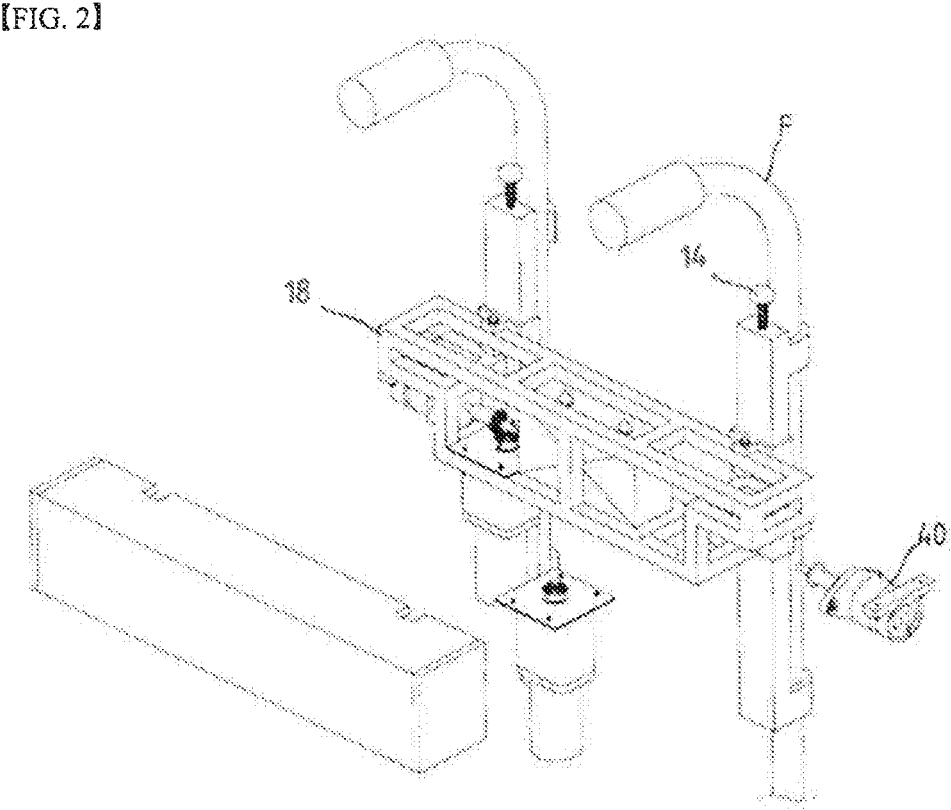

[FIG. 3]
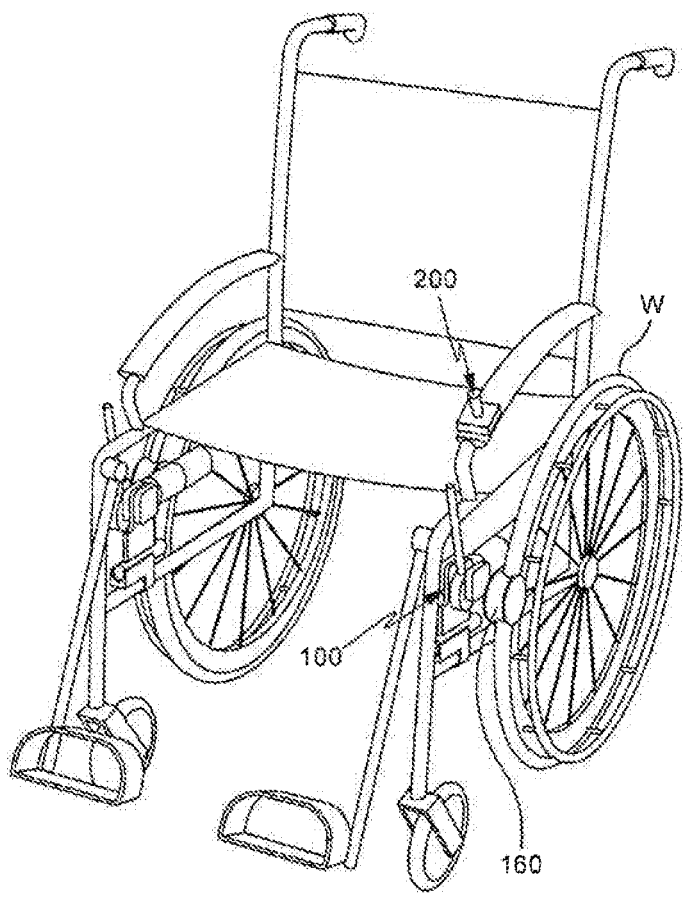

[FIG. 4]
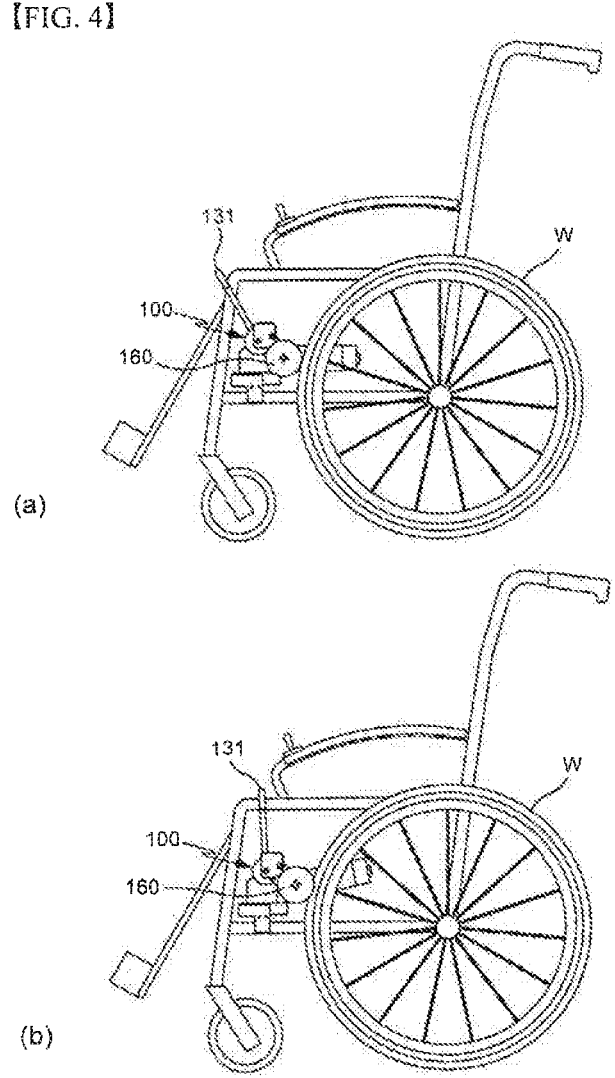
(a)
(b)

[FIG. 5]
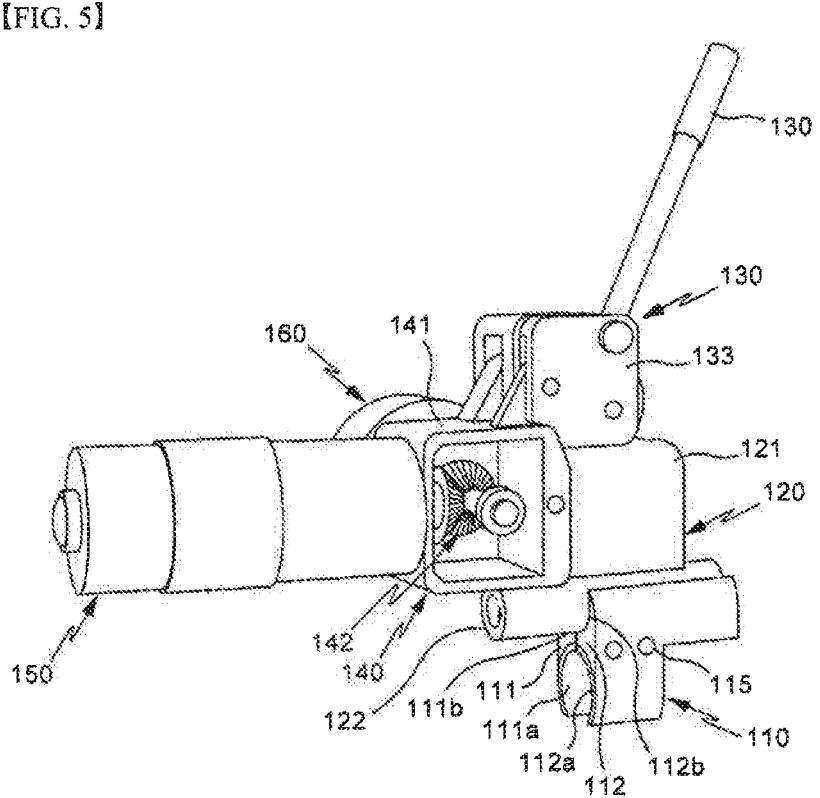

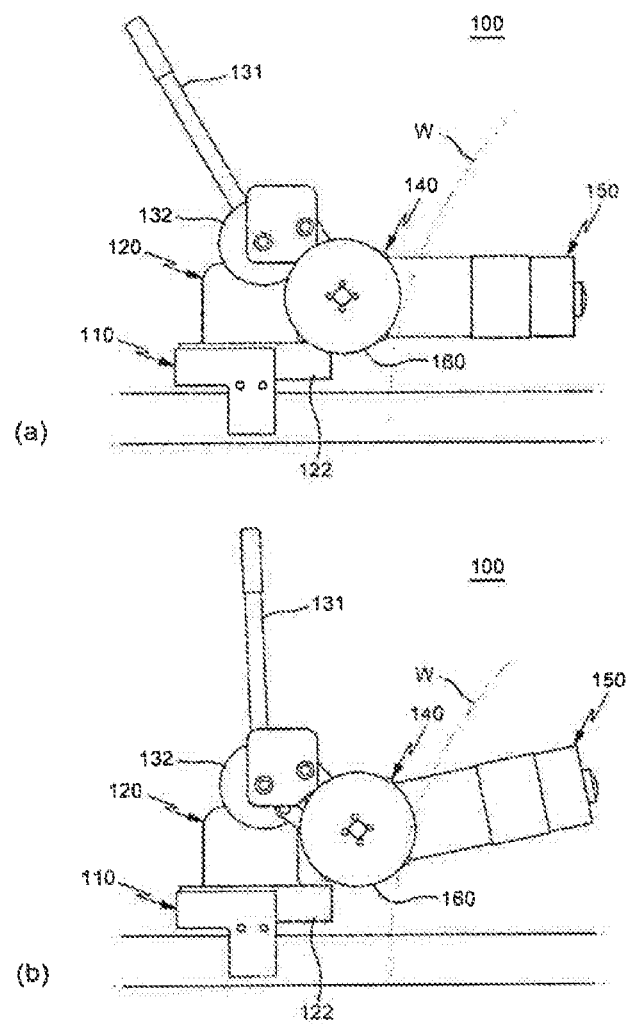

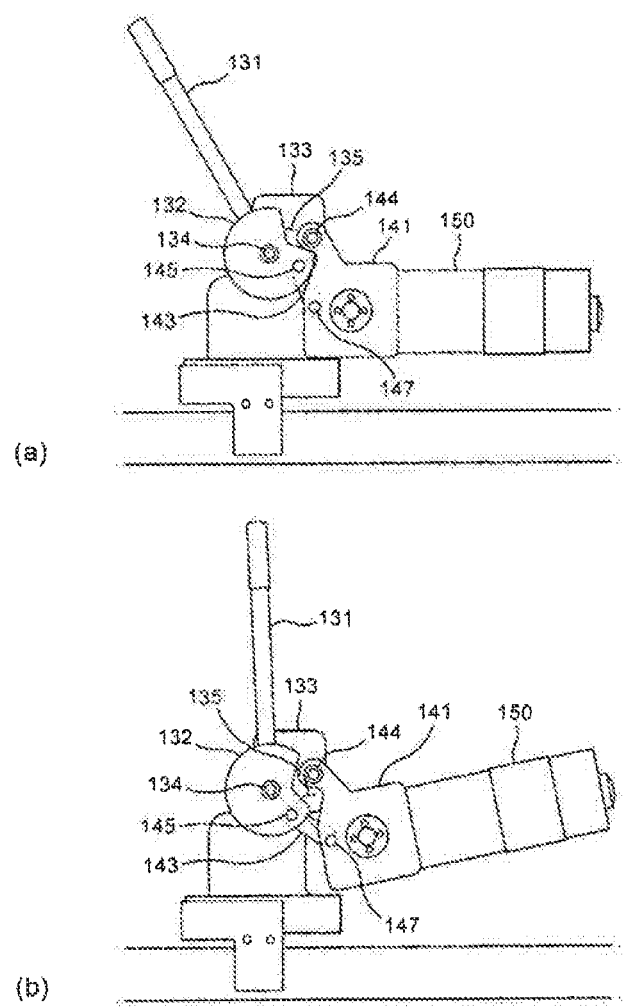
[FIG. 7]

ATTACHING AND DETACHING TYPE DRIVING DEVICE AND WHEELCHAIR HAVING THE SAME

CROSS-REFERENCE TO RELATED APPLICATIONS

The present application is a continuation of International Patent Application No. PCT/KR2016/004834, filed May 9, 2016, which is based upon and claims the benefit of priority to Korean Patent Application No. 10-2016-0010648, filed on Jan. 28, 2016. The disclosures of the above-listed applications are hereby incorporated by reference herein in their entirety.

BACKGROUND

Embodiments of the inventive concept described herein relate to an attaching and detaching type driving device and a wheelchair having the same, and more particularly, relate to an attaching and detaching type driving device, which is formed to be attachable to and detachable from a manual wheelchair whose wheels are manually driven by a user, and to switch the manual wheelchair to an electric wheelchair that automatically drives wheels using electric power, and particularly, which is capable of being attached to and detached from the manual wheelchair regardless of shape or size of the wheelchair, being switched to the electric wheelchair, and supplying the electric wheelchair with low cost, and a wheelchair having the same.

Wheelchairs used as an auxiliary walking device for people with disability are classified into manual and electric wheelchairs depending on how they drive wheels.

In case of the manual wheelchair, handrims are respectively fixed at sides of both wheels to allow the wheels to be propelled manually. The manual wheelchair has advantages such as, inexpensive manufacturing cost and light weight, and in addition, the manual wheelchair is provided with a lever, which enables a main body to be folded, such that the manual wheelchair is folded for storage in a vehicle when boarding in a vehicle. However, for users who cannot manage the manual wheelchair due to severe illness, injury, or disability, it has a fundamental weakness that makes it difficult to propel the manual wheelchair while the user is seated on the wheelchair.

On the contrary, the electric wheelchair has an advantage that people with disability is able to move easily even if he/she does not manually propel the wheels. However, since the electric wheelchair incorporates a battery fixed to both of the frames, it is difficult to apply the lever as a tool for folding. In addition, there is a problem that it is difficult for people with disability to cope with when a driving device is in failure or when the battery is low on charge since mode conversion from an electric mode to a manual mode is not possible.

So as to solve the above mentioned problems, a wheelchair that is able to be used in both electric and manual modes has been suggested. However, this is done by a method that transmits the rotational power directly from the driving module to the rotation axis of the wheel. Since only the mode switching function is added and all the components of a conventional electric wheelchair are required, the cost of the device is the same or even higher than that of the conventional electric wheelchair, thereby putting a heavy burden on the purchaser.

In recent years, different from the method of directly transmitting the rotational power from the power module to the rotation axis of the wheels as described above, an electric driving device for switching the manual wheelchair into the electric wheelchair by rotating the wheels in a state in which a driving roller of the electric module is in contact with the wheels has been developed.

Referring to FIGS. 1 and 2, the electric driving device for the conventional wheelchair, which is detachable from a backrest frame F of the manual wheelchair C and is propelled by a motor driven by a battery, includes a driving roller 40 in close contact with both wheels W of the wheelchair C and a stick type control handle 50.

The driving rollers 40 disposed at both sides rotate in a state in which they are in close contact with the left and right wheels W of the wheelchair C so that the left and right wheels W are rotated forward or backward to move the wheelchair C forward and backward. When a frame main body 18 is raised by turning a height control handle 14, the driving rollers 40 disposed at both sides are spaced apart from the wheels W, the power is not transmitted, and the wheelchair is driven only by manually.

However, such electric driving device for the conventional wheelchair has a problem that the safety of the people of disability is lowered on the inclined surface and the wheels are seriously worn since the center of gravity is moved to the rear of the wheelchair due to the weight of the electric driving device.

Furthermore, since the electric driving device is configured at a center portion between the left and right wheels to drive the left and right wheels, the wheelchair is not folded. Therefore, the wheelchair is disadvantageous in that it is difficult to be mounted on a vehicle due to the electric driving device, the right of mobility of the people with disability is limited, and it is avoided among the people with disability.

SUMMARY

Embodiments of the inventive concept provide an attaching and detaching type driving device, which is formed to be attachable to and detachable from a manual wheelchair, in which a user manually drives wheels, and to switch the manual wheelchair to an electric wheelchair that automatically drives wheels using power, and particularly, which is capable of being attached to and detached from the manual wheelchair regardless of shape or size of the wheelchair, being switched to the electric wheelchair, and supplying the electric wheelchair with low cost, and a wheelchair having the same.

Further, embodiments of the inventive concept provide an attaching and detaching type driving device with a structure in which driving modules are mounted respectively on left and right wheels of the manual wheelchair such that operations of folding and unfolding the wheelchair are not restricted for reasons such as vehicle mounting, and a wheelchair having the same.

Further, embodiments of the inventive concept provide an attaching and detaching type driving device capable of maintaining a structural stability of a wheelchair since a center of gravity does not move forward or backward even though a driving device is installed onto the manual wheelchair, and a wheelchair having the same.

According to an aspect of an embodiment, an attaching and detaching type driving device includes a driving module mounted on each of both installation frames supporting both wheels in a wheelchair and putting rollers in close contact with the wheels to transfer a rotational force of the rollers to the wheels and a steering module controlling a drive of the driving module.

Preferably, the driving module is fixed to the installation frame, which is parallel to a circular surface defined by the wheel, among a plurality of frames for the wheelchair.

Preferably, the installation frame is located at a lower end of a seat of the wheelchair.

Preferably, the driving module includes a clamp for fixing a whole driving module to the installation frame, a body connected to the clamp, a lever disposed on an upper portion of the body to provide a pressing lever manipulated by a user, a gear placed at a side portion of the body and moving to the body according to an operation of front and rear movements of the pressing lever, a motor connected to the gear and transferring the rotational force to the gear, and the roller connected to a side portion of the gear and rotated in response to the rotational force provided from the gear.

Preferably, the motor receives an electric power from a battery and is driven by the electric power.

Preferably, the clamp includes a first clamp and a second clamp, which form a pair of left and right clamps, a first engaging groove and a second engaging groove are respectively defined under the first clamp and the second clamp, and the installation frame is accommodated in the first engaging groove and the second engaging groove to be fixedly coupled while the first clamp and the second clamp are coupled to each other.

Preferably, a first mounting groove and a second mounting groove are respectively defined on upper portions of the first clamp and the second clamp, and a mounting bar of the body is accommodated in the first mounting groove and the second mounting groove to be rotatably coupled while the first clamp and the second clamp are coupled to each other.

Preferably, a position of the roller is controlled by rotating the clamp about the installation frame when the clamp is fixed to the installation frame, and when the clamp rotates, the mounting bar of the body rotates in a direction opposite to a direction in which the clamp rotates to maintain a position of the driving module.

Preferably, the gear includes a gear box, the roller is connected to a side surface of the gear box, the motor is connected to the gear box, and the rotational force from the motor is transferred to the roller after a rotational direction of the rotational force is changed by a gear provided in the gear box.

Preferably, a disk-shaped rotating disk, which is connected to a lower end portion of the pressing lever of the lever to rotate about a first shaft depending on an operation of the pressing lever, is disposed in a disk housing, a stopper section is defined in the disk housing along a direction to the gear box, a second shaft is rotatably coupled to a surface of the disk housing in a region of the stopper section, and a rotating frame projectingly formed on an upper side of the gear box is rotatably coupled to the second shaft, and the gear box is provided to be rotatable about the second shaft.

Preferably, a third shaft is rotatably coupled to a side portion of the stopper section outside the disk housing, one end of a connection link is rotatably coupled to the third shaft, a fourth shaft is rotatably coupled to the other end of the connection link, a side portion of the gear box is rotatably coupled to the fourth shaft, the rotating disk rotates in a forward or reverse direction according to the operation of the pressing lever, and the rotational force of the rotating disk is transmitted to the gear box through the connection link to move the gear box forward or backward.

Preferably, the first shaft rotating the rotating disk, the third shaft connected to the one end of the connection link, and the fourth shaft connected to the other end of the connection link perform a toggle function, and the gear box to which the roller is connected is prevented from moving to the body.

Preferably, when the user selects an electric mode and the pressing lever is locked, the third shaft is located below an imaginary line defined by the first shaft and the fourth shaft such that the first shaft, the third shaft, and the fourth shaft have a V shape, and even though the rotating disk rotates by an external force, a movement of the gear box is blocked since the stopper section is limited by the second shaft.

Preferable, the driving module of the attaching and detaching type driving device is disposed in the installation frame.

According to the present disclosure, the attaching and detaching type driving device is formed to be attachable to and detachable from the manual wheelchair whose wheels are manually driven by the user to switch the manual wheelchair to the electric wheelchair that automatically drives the wheels using the electric power, and particularly, it is possible to attach/detach the driving device and to switch the manual wheelchair to the electric wheelchair regardless of the shape or size of the wheelchair, thereby enabling the supply of the electric wheelchair with low cost.

In addition, since the driving modules are respectively installed to the left and right wheels of the manual wheelchair, there is an effect that the operations of folding and unfolding the wheelchair are not restricted due to the mounting on a vehicle.

Further, even though the driving device is installed to the manual wheelchair, the center of gravity does not move to front or rear of the wheelchair, and thus the structural stability of the wheelchair is maintained.

Further, since the roller has a strong contact maintaining force by a toggle function cause by a link structure in a process of allowing the driving roller to make contact with the wheel of the wheelchair and the close contact between the driving roller and the wheel does not get loose while the running of the wheelchair, thereby having an effect of enabling safe electric running even though an external vibration is applied to the wheels or the contact time of the roller has passed a considerable length of time.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 1 and 2 are respectively a perspective view showing a wheelchair equipped with a driving device and an exploded perspective view showing the driving device;

FIG. 3 is a perspective view showing a wheelchair equipped with a driving module and a steering module according to an exemplary embodiment of the present disclosure;

FIG. 4 is a view explaining a manual mode and an electric mode of a wheelchair according to an exemplary embodiment of the present disclosure;

FIG. 5 is a perspective view showing a driving module according to an exemplary embodiment of the present disclosure;

FIG. 6 is a view explaining a manual mode and an electric mode of a driving module according to an exemplary embodiment of the present disclosure; and FIG. 7 is a partially exploded view explaining a manual mode and an electric mode of a driving module according to an exemplary embodiment of the present disclosure.

DETAILED DESCRIPTION

Hereinafter, an attaching and detaching type driving device and a wheelchair having the same according to the present disclosure will be explained in detail with reference to the accompanying drawings.

Referring to FIG. 3, the attaching and detaching type driving device according to the present disclosure includes a driving module 100 mounted on each of both frames supporting both wheels W in the wheelchair and a steering module 200 controlling the drive of the driving module 100.

The driving module 100 may include a battery (not shown) and thus may be driven for a period of time with its own power without receiving external power. The driving module 100 may transfer a rotational force of a roller 160 to the wheel W at it is while the roller 160 is in close contact with the wheel W to rotate the wheel W, and thus a manual wheelchair may be switched to an electric wheelchair.

Here, the driving module 100 is mounted on and fixed to a frame, which is disposed adjacent to the wheel W and parallel to a circular surface defined by the wheel W, among the frames for the wheelchair. In general, the manual wheelchair is folded and unfolded in a way that a seat on which the people with disability is seated is folded in half. In the present disclosure, since two driving modules 100 are respectively fixed to the frames adjacent to the both wheels W as described above, operations for folding and unfolding the manual wheelchair may not be restricted.

In a process of mounting the driving device of the present disclosure on the manual wheelchair, this may not only switch the manual wheelchair to the electric wheelchair by mounting the driving device of the present disclosure on the manual wheelchair, but also improve a disadvantage of a conventional electric wheelchair, e.g., a problem that the conventional electric wheelchair may not be mounted on a general vehicle (a car, a taxi, etc.), while maintaining a folding function, which is an advantage of the manual wheelchair. In addition, since the conventional driving device is generally mounted behind a backrest of the wheelchair, a center of gravity moves forward or backward when the driving device is mounted on the manual wheelchair, and thus a structural stability of the wheelchair is deteriorated. However, since the driving device according to the present disclosure is mounted on the frame disposed under the seat of the wheelchair, the original structural stability of the wheelchair may be maintained.

Hereinafter, an operation method of the driving device will be described briefly with reference to FIG. 4.

Referring to (a) of FIG. 4, the driving module 100 is mounted on and fixed to the frame adjacent to the wheel, and the roller 160 is not in contact with the wheel W since a stick-shaped pressing lever 131 is pushed to the front of a user on the seat. Here, the driving module 100 is mounted on each of left and right wheels W. That is, the mode described with reference to (a) of FIG. 4 is a manual wheelchair mode, and the wheelchair moves when the user sitting on the seat rotates a handrim of the wheel W manually by himself/herself.

Then, referring to (b) of FIG. 4, when the user on the seat pulls the pressing lever 131 backward, the roller 160 is strongly pressed to the wheel W. This is an electric wheelchair mode, and the user on the seat transfers controls, such as forward, reverse, direction, and speed through the steering module 200. Responsive to the controls, the driving module 100 mounted on each of the both frames is operated to directly transfer the rotational force of the roller 160 to the wheel W, and thus the wheelchair moves in the direction and speed desired by the user.

Hereinafter, a configuration and an operation of the driving module 100 will be described in detail with reference to FIG. 5.

The driving module 100 includes a clamp 110 for fixing the whole driving module 100 to the frame, a body 120 connected to the clamp 110 and rotated about the clamp 110 to maintain a vertical position, a lever 130 disposed on an upper portion of the body 120 to provide a pressing lever 131 manipulated by the user, a gear 140 placed at a side portion of the body 120, moving closer to the body 120 according to the operation of front and rear movements of the pressing lever 131, and including a gear assembly provided therein, a motor 150 connected to the gear 140 and operated by an internal controller to transmit the rotational force to the gear 140, and the roller 160 connected to a side portion of the gear 140 and rotated in response to the rotational force provided from the gear assembly. In this case, the motor 150 receives the power from the battery (not shown) to be driven, and thus the motor 150 may be driven for a period of time with its own power without receiving external power.

The clamp 110 includes a first clamp 111 and a second clamp 112, which form a pair of left and right clamps.

A first engaging groove 111a and a second engaging groove 112a are respectively defined under the first clamp 111 and the second clamp 112. An engaging groove with a semi-circular shape is prepared under the clamp 110 by the first engaging groove 111a and the second engaging groove 112a to surround the frame in a state where the first clamp 111 and the second clamp 112 are coupled to each other. In the above descriptions and drawings, the engaging groove has the semi-circular shape in the state where the first clamp 111 and the second clamp 112 are coupled to each other, but the engaging groove of the present disclosure should not be limited to the semi-circular shape. That is, in a case where the frame of the wheelchair has a quadrangular shape in cross-section rather than a circular shape, the engaging groove may have the quadrangular shape in the state where the first clamp 111 and the second clamp 112 are coupled to each other.

The clamp 110 is securely coupled to the frame by coupling the first clamp 111 and the second clamp 112, which form the pair of left and right clamps, by a coupling bolt such that the first engaging groove 111a and the second engaging groove 112a are tightened to each other.

In addition, a first mounting groove 111b and a second mounting groove 112b are respectively defined on upper portions of the first clamp 111 and the second clamp 112. A mounting groove with a semi-circular shape is prepared above the clamp 110 by the first mounting groove 111b and the second mounting groove 112b to surround a mounting bar 122 of the body 120 in the state where the first clamp 111 and the second clamp 112 are coupled to each other.

In the exemplary embodiment, the mounting bar 122 of the body 120 may rotate in the mounting groove with the semi-circular shape, which is defined by the first mounting groove 111b and the second mounting groove 112b, such that the driving module 100 may be operated after being attached and detached to and from the frame regardless of the shape and size of the wheelchair.

In general, wheelchairs do not have a uniform shape and size, frames under the seat have a variety of shapes and structures depending on manufacturers, and an overall size of the frames also varies. Accordingly, an angle and a distance between the frame disposed under the seat of the wheelchair and the wheel also vary.

As described above, since the angle and distance between the frame and the wheel vary, the driving module 100 rotates the clamp 110 about an installation frame when fixed to the frame by the clamp 110 to adjust the angle and distance such that the roller 160 of the driving module 100 is adjacent to the wheel.

As an example, in a case where the distance between the installation frame and the wheel is relatively large, the roller 160 may be placed adjacent to the wheel by rotating the clamp 110 to the wheel. As another example, in a case where the distance between the installation frame and the wheel is relatively close, the roller 160 may be placed adjacent to the wheel by rotating the clamp 110 inward of the wheelchair.

In this case, as described above, although the clamp 110 rotates or the clamp 110 is inclined, the body 120, the lever 130, the gear 140, and the motor 150 except for the clamp 110 are required to maintain their original positions such that the roller 160 is fully in contact with the wheel. Accordingly, when the clamp 110 rotates, the mounting bar 122 of the body 120 rotates in a direction opposite to a direction in which the clamp 110 rotates, and thus the body 120, the lever 130, the gear 140, and the motor 150 except for the clamp 110 may maintain their original positions.

Due to the rotation of the mounting bar 122 as described above, a body frame 121 of the body 120 may always maintain the vertical position regardless of the shape and size of the wheelchair.

The lever 130 includes the pressing lever 131 pushed or pulled by the user.

FIG. 6 shows movements of the roller 160, the gear 140, and the motor 150 according to forward and reverse motions of the pressing lever 131.

In (a) of FIG. 6, the pressing lever 131 is pushed to the front (i.e., a left side in figure) of the user on the seat, and thus the roller 160 is not in contact with the wheel W. That is, the wheelchair is in the manual wheelchair mode.

Then, the pressing lever 131 is pulled to the user (i.e., a right side in figure) on the seat in (b) of FIG. 6, and thus the roller 160 is in contact with the wheel W. When the pressing lever 131 is pulled during the above-mentioned operation, the gear 140 is pulled, and the roller 160 coupled to a side surface of the gear 140 and the motor 150 connected to the gear 140 move together.

Referring to FIG. 5 again, the gear 140 includes a gear box 141, the roller 160 is connected to a side surface of the gear box 141, and the motor 150 is connected to the gear box 141. For the convenience of explanation, the side surface of the gear box 141 is opened in FIG. 5. The motor 150 is driven in response to the power transmitted from the battery to provide the rotational force, and the rotational force is transmitted to the roller 160 after a rotational direction of the rotational force is changed by a bevel gear 142 provided in the gear box 141.

Hereinafter, configurations of the lever 130 and the gear 140 and a process of switching the manual and electric modes through the lever 130 and the gear 140 will be described in detail with reference to FIG. 7. To improve understanding of explanation, the roller 160 coupled to the gear box 141 is omitted from FIG. 7.

A disk-shaped rotating disk 132, which rotates about a first shaft 134 depending on the pushing and pulling action of the pressing lever 131 at a lower end portion of the pressing lever 131 of the lever 130, is disposed in a disk housing 133. The disk housing 133 is coupled to an upper portion of the body frame 121. In addition, the disk housing 133 includes a stopper section 135 defined therein to be recessed in the shape of fan and formed in a direction to the gear box 141. A second shaft 144 is rotatably coupled to a surface of the disk housing 133 in a region of the stopper section 135, and a rotating frame 146 projectingly formed on an upper side of the gear box 141 is rotatably coupled to the second shaft 144. Consequently, the gear box 141 may rotate about the second shaft 144.

In addition, since the first shaft 134 is located in the region of the stopper section 135, the forward and reverse rotation radius of the rotating disk 132 is limited.

Meanwhile, a third shaft 145 is rotatably coupled to a side portion of the stopper section 135 outside the disk housing 133, and one end of a connection link 143 is rotatably coupled to the third shaft 145. The connection link 143 connects the rotating disk 132 and the gear box 141 and transmits a rotational motion of the rotating disk 132 to the gear box 141 as a roughly rectilinear motion. A fourth shaft 147 is rotatably coupled to the other end of the connection link 143, and a side portion of the gear box 141 is rotatably coupled to the fourth shaft 147. Accordingly, the pushing and pulling action of the pressing lever 131 allows the rotating disk 132 to rotate in forward and reverse directions, the rotational force of the rotating disk 132 is transmitted to the gear box 141 through the connection link 143 as the roughly rectilinear motion, and thus the gear box 141 moves forward and backward. Consequently, the gear box 141 moves to the body 120 due to the forward movement of the gear box 141 as shown in (a) of FIG. 7 such that the roller (not shown) is not in contact with the wheel. Different from the above, the gear box 141 moves to an opposite direction (to the wheel) of the body 120 due to the backward movement of the gear box 141 as shown in (b) of FIG. 7 such that the roller (not shown) is in contact with the wheel.

In the exemplary embodiment, it is possible to easily switch the manual and electric modes by manipulating the pressing lever 131 by the user, however, it is important to prevent the electric mode from being unintentionally released while the wheelchair runs in the electric mode in the use of the wheelchair on which the people with physical disabilities boards. The electric mode may be unintentionally released while the running of the wheelchair when an external vibration is strongly or consistently applied to the wheel or when the contact time of the roller has passed a considerable length of time.

In the exemplary embodiment of the present disclosure, since the roller has a strong contact maintaining force by a toggle function caused by the link structure in the process of allowing the roller to make contact with the wheel of the wheelchair, the above-mentioned unintentional release of the electric mode does not occur.

The structure maintaining the contact force of the roller will be described in more detail. As shown in FIG. 7, since the first shaft 134 rotating the rotating disk 132, the third shaft 145 connected to the one end of the connection link 143, and the fourth shaft 147 connected to the other end of the connection link 143 perform the toggle function, the gear box 141 pushed once to the opposite direction (to the wheel) of the body 120 does not move to the body 120 by the external force.

As shown in (a) of FIG. 7, when the user selects the manual mode and the pressing lever 131 is pushed to the front (i.e., the left side in figure) of the user to be released, the third shaft 145 is located above an imaginary line defined by the first shaft 134 and the fourth shaft 147.

Different from the above, as shown in (b) of FIG. 7, when the user selects the electric mode and the pressing lever 131 is pulled to the user (i.e., the right side in figure) to be locked, the third shaft 145 is located below the imaginary line defined by the first shaft 134 and the fourth shaft 147. That is, the first shaft 134, the third shaft 145, and the fourth shaft 147 have a gently V shape. Accordingly, although the external force is applied to the roller 160 and the gear box 141, the external force acts as a force only to allow the first shaft 134 and the fourth shaft 147 to close to each other. Even though the force generated at this time rotates the rotating disk 132 in a clockwise direction, the movement of the gear box 141 toward the left side is blocked since the stopper section 135 is limited by the second shaft 144. The roller 160 has the strong contact maintaining force against the wheel in the state where the wheelchair is locked in electric mode by the user's hand due to the toggle function by the link structure, and thus the locking mode may not be released due to the external force.

The motor 150 may include a motor generating the rotational force and a driving controller driving the motor. In this case, the driving controller may be configured to increase power efficiency due to characteristics of using the battery as electric power by basically controlling the motor in a pulse width modulation (PWM) method and may perform an acceleration/deceleration control (e.g., an case in/out method control) such that a natural wheelchair movement is achieved even though sudden movements occur.

The roller 160 receives the rotational force from the motor 150 through the bevel gear 142 in the gear box 141 and rotates. The roller 160 may be formed of a metal material and may include a tread pattern formed on an outer surface thereof, which makes contact with the wheel, to transmit its own rotational force to the wheel perfectly.

Meanwhile, the driving module 100 is driven by the control of the steering module 200.

The steering module 200 may be provided in the form of a joystick as shown in FIG. 3. The joystick may be wired to the motor 150 of the driving module 100 of the wheelchair and may be fixed to an armrest of the wheelchair. When the user operates the joystick, the joystick transfers controls, such as forward, reverse, direction, and speed. Responsive to the controls, both the driving modules 100 operate to directly transfer the rotational force of the roller 160 to the wheel W, and thus the wheelchair moves in the direction and speed desired by the user.

For instance, the forward and reverse movements of wheelchair in the electric mode may be accomplished through the forward and reverse rotation control of the motor, and the steering of the wheelchair may be achieved by varying the rotational speed of both (left and right) of the driving modules 100.

In addition, the steering module 200 may be implemented by a smartphone and may be connected in a wireless communication with the driving controller in the motor 100 through a Bluetooth or a WiFi.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A driving device comprising:
   a driving module mounted on each of both installation frames supporting both wheels in a wheelchair and putting rollers in close contact with the wheels to transfer a rotational force of the rollers to the wheels; and
   a steering module controlling a drive of the driving module,
   wherein the driving module comprises:
      a clamp for fixing a whole driving module to the installation frames;
      a body connected to the clamp;
      a lever disposed on an upper portion of the body to provide a pressing lever manipulated by a user;
      a gear placed at a side portion of the body and moving to the body according to an operation of front and rear movements of the pressing lever; and
      a motor connected to the gear and transferring the rotational force to the gear, and
   wherein the respective roller is connected to a side portion of the gear and rotated in response to the rotational force provided from the gear.

2. The driving device of claim 1, wherein the driving module is fixed to the respective installation frame, which is parallel to a circular surface defined by the wheel, among a plurality of frames for the wheelchair.

3. The driving device of claim 2, wherein the installation frame is located at a lower end of a seat of the wheelchair.

4. The driving device of claim 1, wherein the motor receives an electric power from a battery and is driven by the electric power.

5. The driving device of claim 1, wherein the clamp comprises a first clamp and a second clamp, which form a pair of left and right clamps, a first engaging groove and a second engaging groove are respectively defined under the first clamp and the second clamp, and the installation frames are accommodated in the first engaging groove and the second engaging groove to be fixedly coupled while the first clamp and the second clamp are coupled to each other.

6. The driving device of claim 5, wherein a first mounting groove and a second mounting groove are respectively defined on upper portions of the first clamp and the second clamp, and a mounting bar of the body is accommodated in the first mounting groove and the second mounting groove to be rotatably coupled while the first clamp and the second clamp are coupled to each other.

7. The driving device of claim 6, wherein a position of the roller is controlled by rotating the clamp about the installation frames when the clamp is fixed to the installation frames, and when the clamp rotates, the mounting bar of the body rotates in a direction opposite to a direction in which the clamp rotates to maintain a position of the driving module.

8. The driving device of claim 1, wherein the gear comprises a gear box, the roller is connected to a side surface of the gear box, the motor is connected to the gear box, and the rotational force from the motor is transferred to the roller after a rotational direction of the rotational force is changed by a gear provided in the gear box.

9. The driving device of claim 8, wherein a disk-shaped rotating disk, which is connected to a lower end portion of the pressing lever of the lever to rotate about a first shaft depending on an operation of the pressing lever, is disposed in a disk housing, a stopper section is defined in the disk housing along a direction to the gear box, a second shaft is rotatably coupled to a surface of the disk housing in a region of the stopper section, and a rotating frame projectingly formed on an upper side of the gear box is rotatably coupled to the second shaft, and the gear box is provided to be rotatable about the second shaft.

10. The driving device of claim 9, wherein a third shaft is rotatably coupled to a side portion of the stopper section outside the disk housing, one end of a connection link is rotatably coupled to the third shaft, a fourth shaft is rotatably coupled to the other end of the connection link, a side portion of the gear box is rotatably coupled to the fourth shaft, the rotating disk rotates in a forward or reverse direction according to the operation of the pressing lever, and the rotational force of the rotating disk is transmitted to the gear box through the connection link to move the gear box forward or backward.

11. The driving device of claim 10, wherein the first shaft rotating the rotating disk, the third shaft connected to the one end of the connection link, and the fourth shaft connected to the other end of the connection link perform a toggle function, and the gear box to which the roller is connected is prevented from moving to the body.

12. The driving device of claim 11, wherein, when the user selects an electric mode and the pressing lever is locked, the third shaft is located below an imaginary line defined by the first shaft and the fourth shaft such that the first shaft, the third shaft, and the fourth shaft have a V shape, and even though the rotating disk rotates by an external force, a movement of the gear box is blocked since the stopper section is limited by the second shaft.

13. A wheelchair according to claim 1, wherein the driving module of the driving device is disposed in the installation frames.

* * * * *